(12) United States Patent
Schroeder (10) Patent No.: US 12,022,757 B2
(45) Date of Patent: Jul. 2, 2024

(54) SYSTEMS AND METHODS FOR DETECTING CHANGES IN THE OPERATING CONDITION OF A FRAME ASSEMBLY OF AN AGRICULTURAL IMPLEMENT BASED ON LOAD IMBALANCES

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 389 days.

(21) Appl. No.: 17/215,147

(22) Filed: Mar. 29, 2021

(65) Prior Publication Data

US 2022/0304214 A1 Sep. 29, 2022

(51) Int. Cl.
*A01B 63/112* (2006.01)
*A01B 79/00* (2006.01)
*A01B 49/02* (2006.01)

(52) U.S. Cl.
CPC .......... *A01B 63/112* (2013.01); *A01B 79/005* (2013.01); *A01B 49/027* (2013.01)

(58) Field of Classification Search
CPC .... A01B 63/112; A01B 79/005; A01B 49/027
(Continued)

(56) References Cited

U.S. PATENT DOCUMENTS 1,351,501 A * 8/1920 White .................. A01B 21/083
172/593
4,423,789 A * 1/1984 Anderson et al. ..... A01B 21/08
172/585

(Continued)

FOREIGN PATENT DOCUMENTS

EP 3815482 A1 5/2021
WO WO 2019/002545 1/2019

OTHER PUBLICATIONS

European Search Report Corresponding to Application No. 22164692 on Sep. 7, 2022.

*Primary Examiner* — Thomas B Will
*Assistant Examiner* — Joel F. Mitchell
(74) *Attorney, Agent, or Firm* — Rebecca L. Henkel; Rickard K. DeMille; Peter K. Zacharias (57) ABSTRACT

A system for detecting changes in the operating condition of frame assemblies of an agricultural implement includes a main frame assembly and a sub-frame assembly coupled to the main frame assembly, with the sub-frame assembly being configured to support a plurality of ground-engaging tools. The system also includes first and second load sensors configured to provide data indicative of a load applied through respective first and second portions of the sub-frame assembly, and a computing system communicatively coupled to the first and second load sensors. The computing system is configured to monitor the loads applied through the first and second portions of the sub-frame assembly based on the data provided by the first and second load sensors, and determine that a change in an operating condition of the sub-frame assembly has occurred based on a differential between the loads applied through the first and second portions of the sub-frame assembly.

17 Claims, 5 Drawing Sheets

(58) Field of Classification Search
USPC .............................................. 172/7
See application file for complete search history.

(56) References Cited

U.S. PATENT DOCUMENTS

| | | | |
|---|---|---|---|
| 4,446,924 A * | 5/1984 | Dietrich, Sr. .......... | A01B 49/02 |
| | | | 172/178 |
| 5,421,416 A | 6/1995 | Orbach et al. | |
| 6,497,153 B1 | 12/2002 | Hoskinson et al. | |
| 6,557,646 B1 * | 5/2003 | Hurtis et al. ......... | A01B 21/083 |
| | | | 172/182 |
| 8,496,068 B1 | 7/2013 | Kosmicki et al. | |
| 8,700,270 B2 | 4/2014 | Foster et al. | |
| 10,071,610 B2 | 9/2018 | Tuttle et al. | |
| 10,172,273 B2 | 1/2019 | Gschwendtner et al. | |
| 10,670,479 B2 | 6/2020 | Reed et al. | |
| 10,696,109 B2 | 6/2020 | Gießibl | |
| 2005/0006946 A1 | 1/2005 | Traechtler et al. | |
| 2014/0379122 A1 | 12/2014 | Gerdeman et al. | |
| 2015/0289436 A1 | 10/2015 | Singh | |
| 2018/0310466 A1 * | 11/2018 | Kovach et al. .......... | G01D 5/12 |
| 2018/0364128 A1 * | 12/2018 | Stovall et al. .......... | G01L 13/06 |
| 2019/0235529 A1 | 8/2019 | Barrick et al. | |
| 2020/0146199 A1 * | 5/2020 | Pasquier et al. ... | A01B 63/1006 |
| 2020/0154626 A1 | 5/2020 | Schoeny et al. | |
| 2021/0045278 A1 | 2/2021 | Henry | |
| 2021/0120726 A1 * | 4/2021 | Barrick et al. ........... | A01B 5/00 |
| 2021/0219482 A1 * | 7/2021 | Smith et al. .......... | A01B 76/00 |

* cited by examiner

SYSTEMS AND METHODS FOR DETECTING CHANGES IN THE OPERATING CONDITION OF A FRAME ASSEMBLY OF AN AGRICULTURAL IMPLEMENT BASED ON LOAD IMBALANCES

FIELD

The present disclosure relates generally to agricultural implements and, more particularly, to systems and methods for detecting changes in the operating condition of one or more frame assemblies of an agricultural implement based on frame-based load imbalances, such as detecting changes in the operating condition of a frame assembly that are indicative of a damaged condition of the frame assembly.

BACKGROUND

A wide range of agricultural implements have been developed and are presently in use for tilling, cultivating, harvesting, and so forth. Tillage implements, for example, are commonly towed behind tractors and may cover wide swaths of ground that include various types of residue. Accordingly, tillers typically include ground-engaging tools, such as shanks, disks, and tillage points, configured to condition the soil for improved moisture distribution while reducing soil compaction from such sources as machine traffic, grazing cattle, and standing water.

During tillage operations, various ground-engaging tools may impact a large impediment, such as a large rock, root, or other object within the ground. Such impacts can damage the ground-engaging tools and/or associated frame assemblies of the agricultural implement. As a result, catastrophic failure of a component of the agricultural implement may occur yet remain undetected until a later time, such as during an inspection of the implement after the tillage operation is complete. Continued operation of the tillage implement after the catastrophic failure can result in additional damage to the ground-engaging tools and/or the associated frame assemblies. Similarly, frame assemblies can be repeatedly or cyclically stressed during tillage operations in a manner that can produce fatigue and/or crack growth. Such progressive failures may remain undetected and worsen until a later catastrophic failure occurs.

Accordingly, systems and methods for automatically detecting changes in the operating condition of one or more frame assemblies of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for detecting changes in the operating condition of frame assemblies of an agricultural implement. The system includes a main frame assembly and a sub-frame assembly coupled to the main frame assembly, with the sub-frame assembly being configured to support a plurality of ground-engaging tools relative to the main frame assembly. The system also includes a first load sensor configured to provide data indicative of a load applied through a first portion of the sub-frame assembly, and a second load sensor configured to provide data indicative of a load applied through a second portion of the sub-frame assembly. Additionally, the system includes a computing system communicatively coupled to the first and second load sensors. The computing system is configured to monitor the loads applied through the first and second portions of the sub-frame assembly based on the data provided by the first and second load sensors, and determine that a change in an operating condition of the sub-frame assembly has occurred based on a differential between the loads applied through the first and second portions of the sub-frame assembly.

In another aspect, the present subject matter is directed to an agricultural implement including a main frame assembly comprising first and second longitudinally extending frame members, with the first and second frame members being spaced laterally apart from each other. The implement also includes a sub-frame assembly configured to support a plurality of ground-engaging tools relative to the main frame assembly, with the sub-frame assembly comprising a first frame component coupled to the first frame member and a second frame component coupled to the second frame member. Additionally, the implement includes a first load sensor configured to provide data indicative of a load applied through the first frame component of the sub-frame assembly, and a second load sensor configured to provide data indicative of a load applied through a second frame component of the sub-frame assembly. Moreover, the implement includes a computing system communicatively coupled to the first and second load sensors. The computing system is configured to monitor the loads applied through the first and second frame components of the sub-frame assembly based on the data provided by the first and second load sensors, and determine that a change in an operating condition of the sub-frame assembly has occurred based on a differential between the loads applied through the first and second frame components of the sub-frame assembly.

In a further aspect, the present subject matter is directed to a method for detecting changes in the operating condition of frame assemblies of an agricultural implement. The agricultural implement includes a main frame assembly and a sub-frame assembly coupled to the main frame assembly, with the sub-frame assembly being configured to support a plurality of ground-engaging tools relative to the main frame assembly. The method includes monitoring, with a computing system, a load applied through a first portion of the sub-frame assembly, and monitoring, with the computing system, a load applied through a second portion of the sub-frame assembly. Additionally, the method includes determining, with the computing system, that a change in an operating condition of the sub-frame assembly has occurred based on a differential between the loads applied through the first and second portions of the sub-frame assembly, and automatically initiating, with the computing system, a control action in response to determining that the change in the operating condition has occurred.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting changes in the operating condition of one or more frame assemblies of an agricultural implement. Specifically, in several embodiments, the disclosed system may be utilized to monitor the operational status of a sub-frame assembly of an agricultural implement. During normal operating conditions, the loads transmitted through a given sub-frame assembly are typically balanced across the lateral width of the assembly. However, if one or more components of the sub-frame assembly are in a damaged condition (e.g., due to such component(s) being damaged or even failed), the loads applied through the sub-frame assembly typically become imbalanced, with higher loads being experienced along one lateral side or portion of the sub-frame assembly as compared to an opposed lateral side or portion of the sub-frame assembly (e.g., depending on the damage/failure type and which frame component has experienced such damage/failure).

Accordingly, by monitoring the loads applied through a sub-frame assembly of an agricultural implement at different laterally spaced locations during the performance of a tillage operation, it may be inferred or determined when one or more components of the sub-frame assembly have a damaged condition. For example, the loads applied through different, laterally spaced portions of a sub-frame assembly may be monitored to determine when a load differential exists between such laterally spaced portions of the sub-frame assembly. The load differential may then be compared to a corresponding load differential threshold selected for the sub-frame assembly to determine or infer when one or more components of the sub-frame assembly are damaged or have failed. Upon inferring or determining that such component(s) has a damaged condition, a suitable control action may be executed, such as notifying the operator or automatically adjusting the operation of the implement or the associated tow vehicle.

Figure 1:
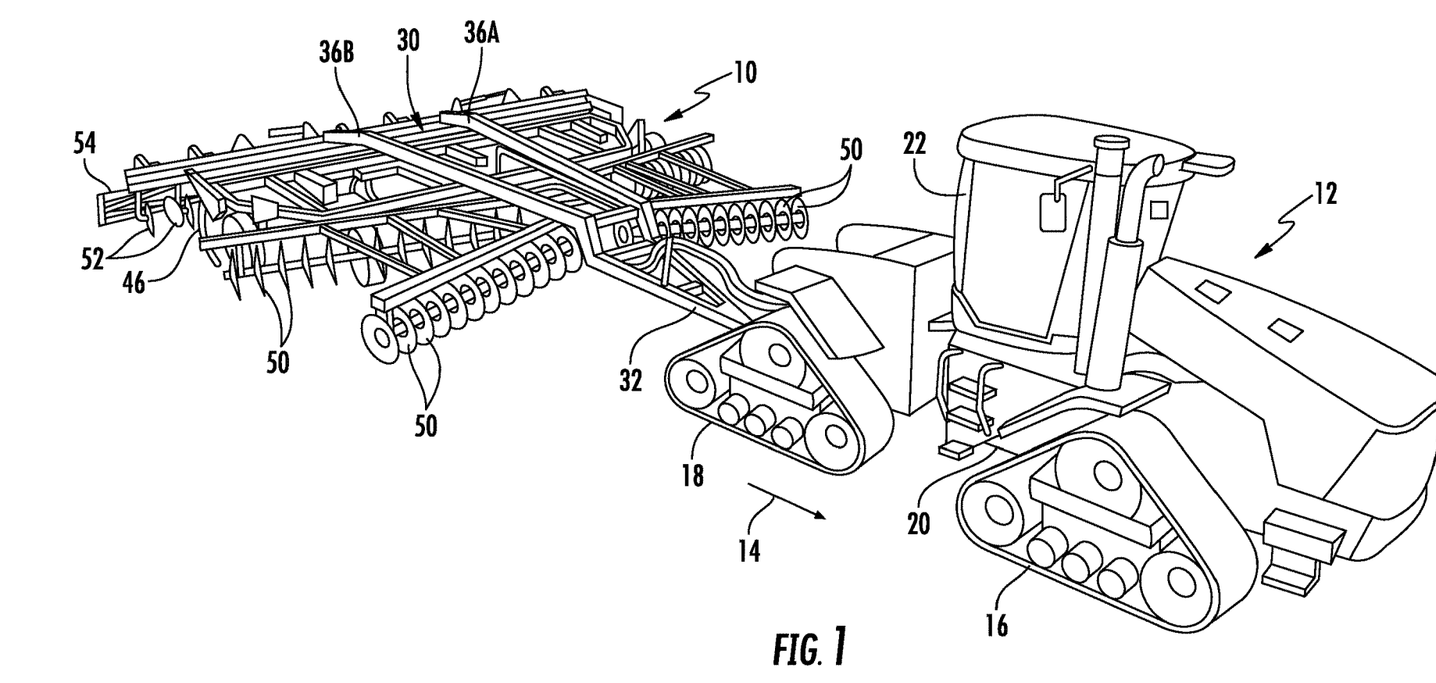
FIG. 1 illustrates a perspective view of one embodiment of an agricultural implement coupled to a work vehicle in accordance with aspects of the present subject matter.
Figure 2:
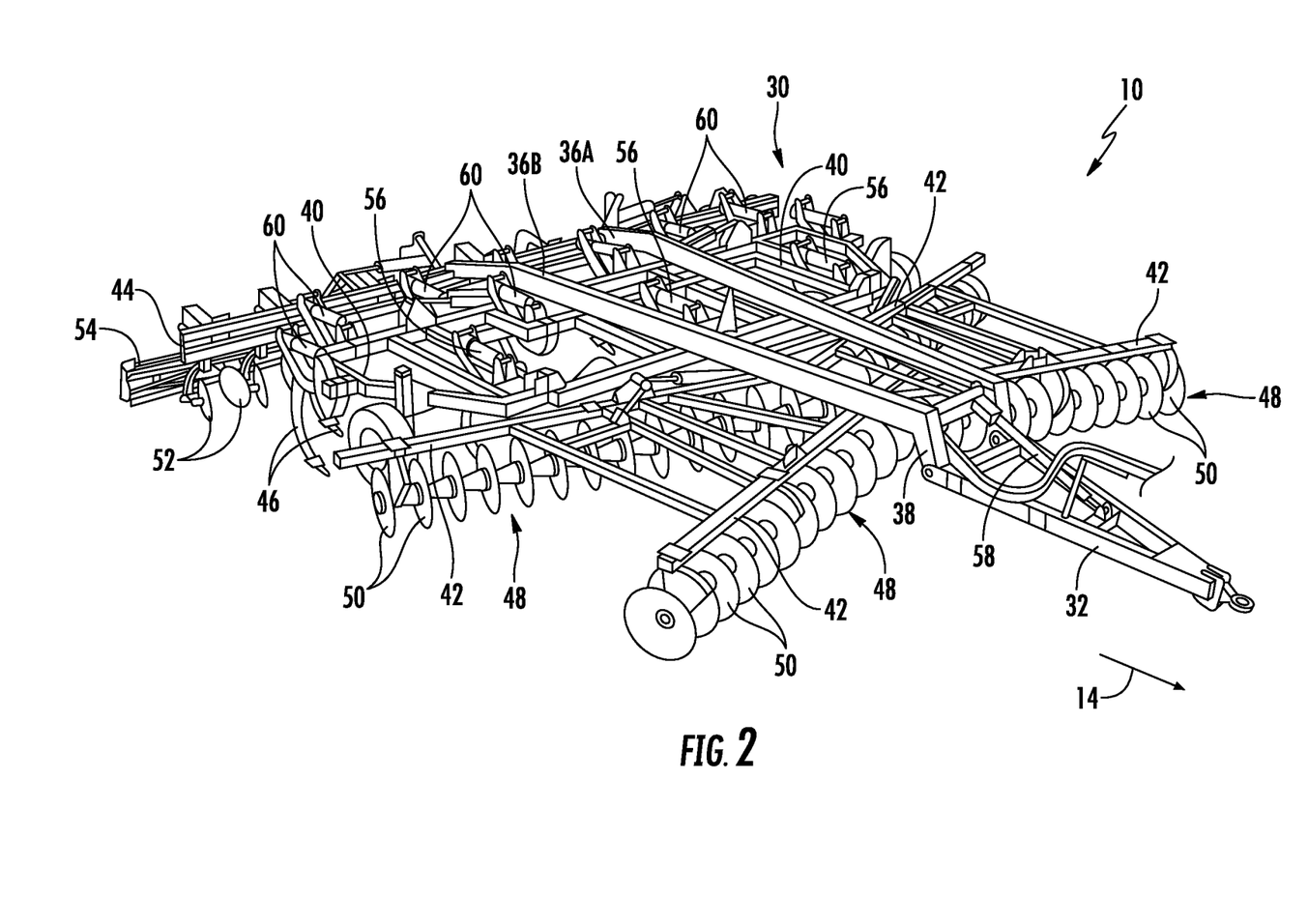
FIG. 2 illustrates another perspective view of the agricultural implement shown in FIG. 1 in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include various drive components (not shown), such as an engine and a transmission mounted on the chassis 20. The transmission may be operably coupled to the engine and may provide variably adjusted gear ratios for transferring engine power to the track assemblies 16, 18 via a drive axle assembly (not shown) (or via axles if multiple drive axles are employed).

Moreover, as shown in FIGS. 1 and 2, the implement 10 may generally include a carriage or main frame assembly 30 configured to be towed by the work vehicle via a pull hitch or tow bar 32 in the direction of travel 14 of the vehicle 12. As is generally understood, the main frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 10 is being towed.

As particularly shown in FIG. 2, the main frame assembly 30 may include a pair of longitudinally extending, laterally spaced carrier frame members coupled to the tow bar 32 (e.g., a left-side carriage frame member 36A and a right-side carriage frame member 36B). In addition, reinforcing gusset plates 38 may be used to strengthen the connection between the tow bar 32 and the carrier frame members 36A, 38B. In several embodiments, the main frame assembly 30 may generally function to support a plurality of sub-frame assemblies of the implement 10, such as a central sub-frame assembly 40, a forward sub-frame assembly 42 positioned forward of the central sub-frame assembly 40 in the direction of travel 14 of the work vehicle 12, and an aft sub-frame assembly 44 positioned aft of the central sub-frame assembly 40 in the direction of travel 14 of the work vehicle 12. Each sub-frame assembly may generally include a plurality of structural frame members, such as beams, bars (including toolbars), and/or the like, configured to support or couple to a plurality of components.

As shown in FIG. 2, in one embodiment, the central sub-frame assembly 40 may correspond to a shank frame configured to support a plurality of ground-engaging shanks 46. In such an embodiment, the shanks 46 may be configured to till the soil as the implement 10 is towed across the field. However, in other embodiments, the central sub-frame assembly 40 may be configured to support any other suitable ground-engaging tools.

Additionally, as shown in FIG. 2, in one embodiment, the forward sub-frame assembly 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 14 of the work vehicle 12 to promote more effective tilling of the soil. However, in other embodiments, the forward sub-frame assembly 42 may be configured to support any other suitable ground-engaging tools.

Moreover, similar to the central and forward sub-frame assembly 40, 42, the aft sub-frame assembly 44 may also be configured to support a plurality of ground-engaging tools. For instance, in the illustrated embodiment, the aft frame is configured to support a plurality of finishing tools, such as a plurality of leveling blades 52 and rolling (or crumbler) basket assemblies 54. However, in other embodiments, any other suitable ground-engaging tools may be coupled to and supported by the aft sub-frame assembly 44, such as a plurality closing disks.

In addition, the implement 10 may also include any number of suitable actuators (e.g., hydraulic cylinders) for adjusting the relative positioning, penetration depth, and/or down force pressure associated with the various ground-engaging tools 46, 50, 52, 54. For instance, as shown in FIG. 2, the implement 10 may include one or more first actuators 56 coupled to the central sub-frame assembly 40 for raising or lowering the central sub-frame assembly 40 relative to the ground, thereby allowing the penetration depth and/or the down pressure of the shanks 46 to be adjusted. Similarly, the implement 10 may include one or more second actuators 58 coupled to the forward sub-frame assembly 42 to adjust the penetration depth and/or the down pressure of the disk blades 50. Moreover, the implement 10 may include one or more third actuators 60 coupled to the aft sub-frame assembly 44 to allow the aft sub-frame assembly 44 to be moved relative to the carriage frame members 36A, 36B and/or the central sub-frame assembly 40, thereby allowing the relevant operating parameters of the finishing tools 52, 54 supported by the aft sub-frame assembly 44 (e.g., the down pressure and/or the penetration depth) to be adjusted.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
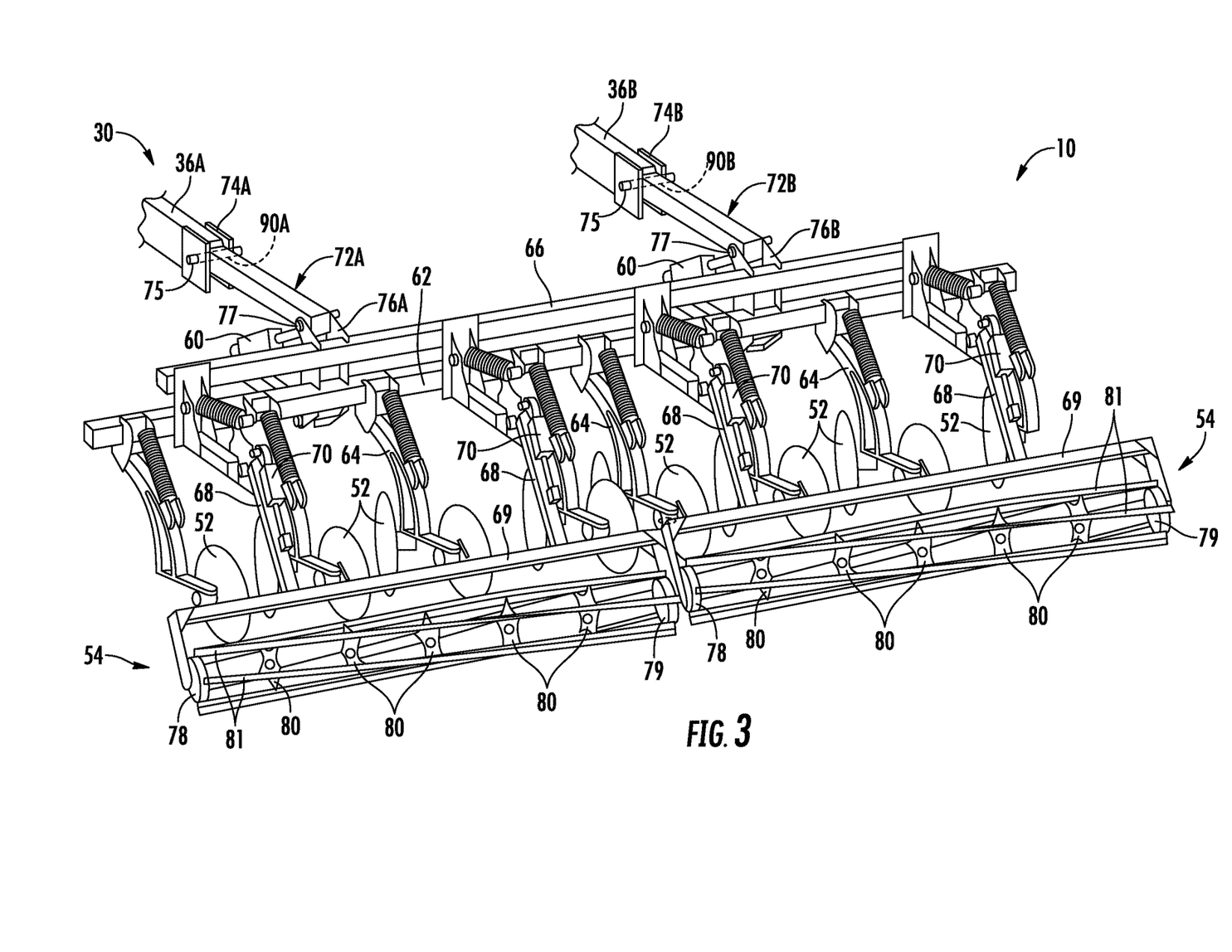
FIG. 3 illustrates a partial perspective view of an aft portion of the agricultural implement shown in FIGS. 1 and 2 in accordance with aspects of the present subject matter, particularly illustrating an aft sub-frame assembly of the implement for supporting a plurality of finishing tools of the implement.

Referring now to FIG. 3, a partial perspective view of an aft portion of the agricultural implement 10 shown in FIGS. 1 and 2 is illustrated in accordance with aspects of the present subject matter, particularly illustrating the aft sub-frame assembly 44 and associated finishing tools 52, 54 of the implement 10. As shown in FIG. 3, the aft sub-frame assembly 44 may include a plurality of frame components configured to support the finishing tools 52, 54 relative to the main frame assembly 30 (e.g., the carriage frame members 36A, 36B). For instance, the aft sub-frame assembly 44 includes a laterally extending blade toolbar 62 and a plurality of blade support arms 64 coupled to and extending from the blade toolbar 62, with each blade support arm 64 configured to support a corresponding leveler disk 52 (or set of leveler disks 52) relative to the toolbar 62.

Additionally, the aft sub-frame assembly includes a laterally extending basket toolbar 66 and one or more pairs of basket support arms 68 coupled to and extending from the blade toolbar 66, with each pair of basket support arms 68 configured to support a corresponding basket assembly 54 relative to the toolbar 66. For instance, each basket support arm 68 may be coupled between the basket toolbar 66 and an associated mounting yoke or basket hanger 69 for supporting each basket assembly 54 relative to the toolbar 66. In one embodiment, a basket actuator 70 (e.g., a hydraulic or pneumatic cylinder) may also be coupled to each basket support arm 68 to allow the down force or down pressure applied to each basket assembly 54 to be adjusted. The basket actuators 70 may also allow the basket assemblies 54 to be raised off the ground independently of the leveler disks 52.

Moreover, the aft sub-frame assembly 44 includes a pair of laterally spaced frame components (e.g., one or more first or left-side frame support arms 72A and one or more second or right-side frame support arms 72B) for coupling the toolbars 62, 66 to the main frame assembly 30. Specifically, as shown in FIG. 3, the left-side frame support arm(s) 72A may extend between a first end and a second end, with the first end being pivotably coupled to the left-side carriage frame member 36A of the main frame assembly 30 via an associated first or left-side frame-to-frame mounting bracket 74A (and corresponding mounting bolts or pins 75) and the second end being coupled to the toolbars 62, 66 of the aft sub-frame assembly 44 via a first or left-side frame-to-toolbar mounting bracket 76A (and corresponding mounting bolts or pins 77). Similarly, the right-side frame support arm(s) 72B may extend between a first end and a second end, with the first end being pivotably coupled to the right-side carriage frame member 36B of the main frame assembly 30 via an associated second or right-side frame-to-frame mounting bracket 74B (and corresponding mounting bolts or pins 75) and the second end being coupled to the toolbars 62, 66 of the aft sub-frame assembly 44 via a second or right-side frame-to-toolbar mounting bracket 76B (and corresponding mounting bolts or pins 77). The pivotable connection between the aft sub-frame assembly 44 and the carriage frame members 36A, 36B allows the aft sub-frame assembly 44 (along with the tools 52, 55 coupled thereto) to be pivoted upwardly or downwardly relative to the main frame assembly 30 to raise or lower the finishing tools 52, 54 relative to the ground (e.g., via operation of the associated actuators 60).

It should be appreciated that the basket assemblies 54 may generally have any suitable configuration. For instance, as shown in FIG. 3, each basket assembly 54 includes a plurality of support plates 78, 79, 80 configured to support a plurality of blades or bars 81 spaced circumferentially about the outer perimeter of the basket, such as first and second end plates 78, 79 positioned at the opposed lateral ends of the basket assembly 54 and a plurality of inner support plates 80 spaced apart laterally from one another between the end plates 78, 79. As is generally understood, the end plates 78, 79 may be rotatably coupled to the corresponding basket hanger 69 (which, in turn, is coupled to the associated basket support arm(s) 68) via bearings to allow the basket assembly 54 to rotate relative to the hanger/arm(s) 69, 68 as implement 10 is being moved across the field. Additionally, in the illustrated embodiment, the bars 81 of each basket assembly 54 are configured as formed bars. However, in other embodiments, the bars 81 may have any other suitable configuration, such as flat bars, round bars, angled bars, and/or the like.

As the implement 10 is moved across the field, one or more of the finishing tools 52, 54 may impact a large impediment, such as a large rock, root, or other object within the ground, which can lead to damage occurring to and/or failure of one or more frame components of the aft sub-frame assembly 44. Similarly, based on the nature of the operation being performed within the field, the frame components of the aft sub-frame assembly 44 may be subject to repeated or cyclical stresses that can produce fatigue and/or crack growth, eventually resulting in damage to and/or failure of such components. When one or more frame components of the aft sub-frame assembly 44 have a damaged condition (e.g., due to damage or even failure of the component(s)), the loads applied through the aft sub-frame assembly 44 typically become imbalanced, with higher loads being experienced along one lateral side or portion of the sub-frame assembly 44 as compared to the other lateral side or portion of the sub-frame assembly 44 (e.g., depending on the damage/failure type and which frame component has experienced such damage/failure). As such, by monitoring the loads applied through the aft sub-frame assembly 44 at different laterally spaced locations during the performance of a tillage operation, it may be inferred or determined when one or more components of the aft sub-frame assembly 44 have a damaged condition. For example, as will be described below, the loads applied through different, laterally spaced portions of the aft sub-frame assembly 44 may be monitored to determine when a load differential exists between such laterally spaced portions of the sub-frame assembly 44. The load differential may then be compared to a corresponding load differential threshold selected for the sub-frame assembly 44 to determine or infer when one or more components of the aft sub-frame assembly 44 are damaged or have failed.

In several embodiments, the load applied through the aft sub-frame assembly 44 may be monitored using two or more load sensors 90 provided in operative association with two or more laterally spaced frame components of the aft sub-frame assembly 44. For instance, in the illustrated embodiment, one or more load sensors 90 are provided in operative association with each frame support arm(s) 72A, 72B to monitor the loads applied through the aft sub-frame assembly 44 at laterally spaced apart locations. Specifically, as shown in FIG. 3, a first or left-side load sensor 90A (e.g., a load pin or load cell, such as a donut load cell) is provided at the bolted or pinned connection provided between the first or left-side frame support arm(s) 72A and the adjacent left-side carriage frame member 36A and a second or right-side load sensor 90B (e.g., a load pin or load cell, such as a donut load cell) is provided at the bolted or pinned connection provided between the second or right-side frame support arm(s) 72B and the adjacent right-side carriage frame member 36B, thereby allowing the loads applied through each support arm(s) 72A, 72B to be monitored. In another embodiment, left-side and right-side load sensors 90 (e.g., load pins or load cells) may be provided at the bolted or pinned connections provided between the frame support arms 72A, 72B and the associated left-side and right-side frame-to-toolbar brackets 76A, 76B to monitor the loads applied through the aft sub-frame assembly 44 at such laterally spaced apart locations. In yet another embodiment, left-side and right-side load sensors 90 in the form of strain gauges may be installed on the left-side and right-side frame support arms 72A, 72B, respectively. In further embodiments, the load sensor(s) 90 may correspond to any other suitable sensing devices or systems and/or may be provided in operative association with any other suitable components of the aft sub-frame assembly 44 so as to provide an indication of the loads applied through the sub-frame assembly 44.

Figure 4:
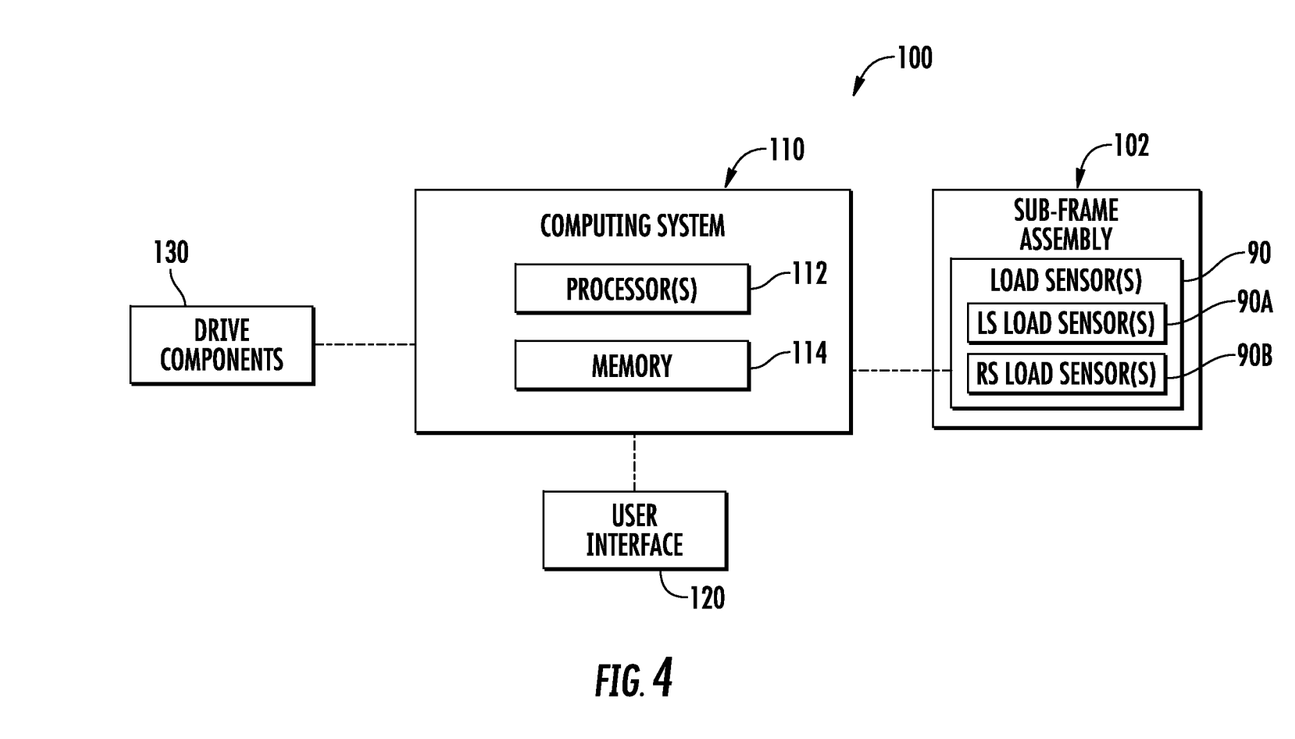
FIG. 4 illustrates a schematic view of one embodiment of a system for detecting changes in the operating condition of one or more frame assemblies of an agricultural implement in accordance with aspects of the present subject matter.

Referring now to FIG. 4, a schematic view of one embodiment of a system 100 for detecting changes in the operating condition of one or more frame assemblies of an agricultural implement is illustrated in accordance with aspects of the present subject matter. In general, the system 100 will be described herein with reference to the implement 10 and aft sub-frame assembly 44 described above with reference to FIGS. 1-3. However, it should be appreciated by those of ordinary skill in the art that the disclosed system 100 may generally be utilized with agricultural implements having any other suitable implement configuration and/or with frame assemblies having any other suitable configuration. For instance, in addition to the aft sub-frame assembly 44, aspects of the present subject matter may also be utilized to detect changes in the operating condition of any other suitable frame assemblies of an agricultural implement, such as the forward and/or central sub-frame assemblies 40, 42 described above.

In general, the system 100 may include one or more components of an agricultural implement, such as one or more of the components of the implement 10 described above. For example, as shown in FIG. 4, the system 100 may include one or more sub-frame assemblies 102 of the implement 10 (e.g., the aft sub-frame assembly 44). Additionally, the system 100 may include two or more load sensors (e.g., the load sensors 90 described above) provided in operative association with the sub-frame assembly 102, with the load sensors 90 being configured to provide data indicative of the load applied through the sub-frame assembly 102 at two or more corresponding laterally spaced apart locations. For instance, as described above, the load sensors 90 may correspond to left-side and right-side load sensors 90A, 90B, such as left-side and right-side load pins or load cells provided at the joints or connections between each frame support arm(s) 72A, 72B and the adjacent carriage frame member 36A, 36B and/or the adjacent toolbar bracket 76A, 76B. Alternatively, the load sensors 90 may correspond left-side and right-side strain gauges provided in association with each frame support arm(s) 72A, 72B to allow the load applied through the sub-frame assembly to be monitored.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

As indicated above, in several embodiments, the computing system 110 may be configured to monitor the loads applied through two different, laterally spaced portions of the sub-frame assembly 102 (e.g., based on the data provided by the load sensors 90A, 90B) to identify a load imbalance across the sub-frame assembly 102. For instance, in embodiments in which the load sensors 90A, 90B are provided in operative association with the left-side and right-side frame support arms 72A, 72B, the loads applied through the support arms 72A, 72B may be monitored and subsequently compared to identify when a load differential exists between the loads being transmitted through the sub-frame assembly 102. The identified load differential may then be compared to an associated load differential threshold selected for the sub-frame assembly 102 to determine or infer when one or more components of the sub-frame assembly 102 are damaged or have failed.

For instance, during normal operation (e.g., when the sub-frame assembly 102 is not in a damaged condition), it may be generally expected that the loads being transmitted through the frame support arms 72A, 72B will be substantially equal (e.g., within a given tolerance range, such as within +/−10% or +/−5%). However, when a given frame component(s) of the sub-frame assembly 102 is damaged or has failed, the load transmitted through the frame support arms 72A, 72B may differ significantly. For instance, if one of the left-side frame components of the sub-frame assembly 102 has failed (e.g., the left-side frame-to-frame mounting bracket 74A, the left-side frame support arm(s) 72A, and/or the left-side frame-to-toolbar mounting bracket 76A), all or a portion of the load typically transmitted through such left-side frame components will, instead, be transmitted through the right-side frame components of the sub-frame assembly 102 (e.g., the right-side frame-to-frame mounting bracket 74B, the right-side frame support arm(s) 72B, and the right-side frame-to-toolbar mounting bracket 76B), thereby creating a load imbalance across the sub-frame assembly 102 that can be detected via the load sensors 90A, 90B. In this regard, the load differential threshold applied by the computing system 110 to determine or infer when one or more components of the sub-frame assembly 102 are damaged or have failed may generally be selected based on the expected or anticipated load imbalance that should exist across the sub-frame assembly 102 as a result of such component damage/failure.

Referring still to FIG. 4, the system 100 may also include a user interface 120 communicatively coupled to the computing system 110. In one embodiment, the user interface 120 may be configured to provide feedback (e.g., notifications associated with the operating condition of one or more components of the implement 10). For instance, the computing system 110 may be configured to alert the operator of a change in the operating condition of one or more of the sub-frame assemblies of the implement 10, such as when it is determined that one or more frame components of a given sub-frame assembly 102 have been damaged or have failed, thereby allowing the operator to make a determination as to whether it is necessary to stop the operation of the implement 10 to check the status of the such frame component(s).

It should be appreciated that the user interface 120 may include or be associated with one or more feedback devices (not shown), such as display screens, speakers, warning lights, and/or the like, which are configured to communicate such feedback. In one embodiment, the computing system 110 may be configured to generate an interface element for display to an operator on the user interface 120. In such an embodiment, the interface element may, for example, be associated with a visual indicator indicative of the operating condition of the components being monitored (e.g., by indicating a change in the operating condition of the sub-frame assembly 102). In addition, some embodiments of the user interface 120 may include one or more input devices (not shown), such as touchscreens, keypads, touchpads, knobs, buttons, sliders, switches, mice, microphones, and/or the like, which are configured to receive user inputs from the operator. In one embodiment, the user interface 120 may be positioned within the operator's cab 22 of the work vehicle 12. However, in alternative embodiments, the user interface 120 may have any suitable configuration and/or be positioned in any other suitable location.

In addition to such operator notifications (or as an alternative thereto), the computing system 110 may be configured to implement any other suitable control action in response to determining that a change in the operating condition of one or more sub-frame assemblies of the implement 10 has occurred. For example, the computing system 110 may control the operation of one or more drive components 130 configured to drive the work vehicle 12 coupled to the implement 10, such as the engine and/or transmission of the vehicle 12. In such embodiments, the computing system 110 may be configured to control the operation of the drive component(s) 130 to reduce the ground speed of the vehicle/implement, including bring the vehicle/implement to a complete stop. By bringing the vehicle/implement to a stop, the system 100 may prevent further frame damage from occurring. It should be appreciated that, depending on the type of control system being used, the above-described control actions may be executed directly by the computing system 110 or indirectly via communications with a separate computing system (e.g., using an ISObus communications protocol).

Figure 5:
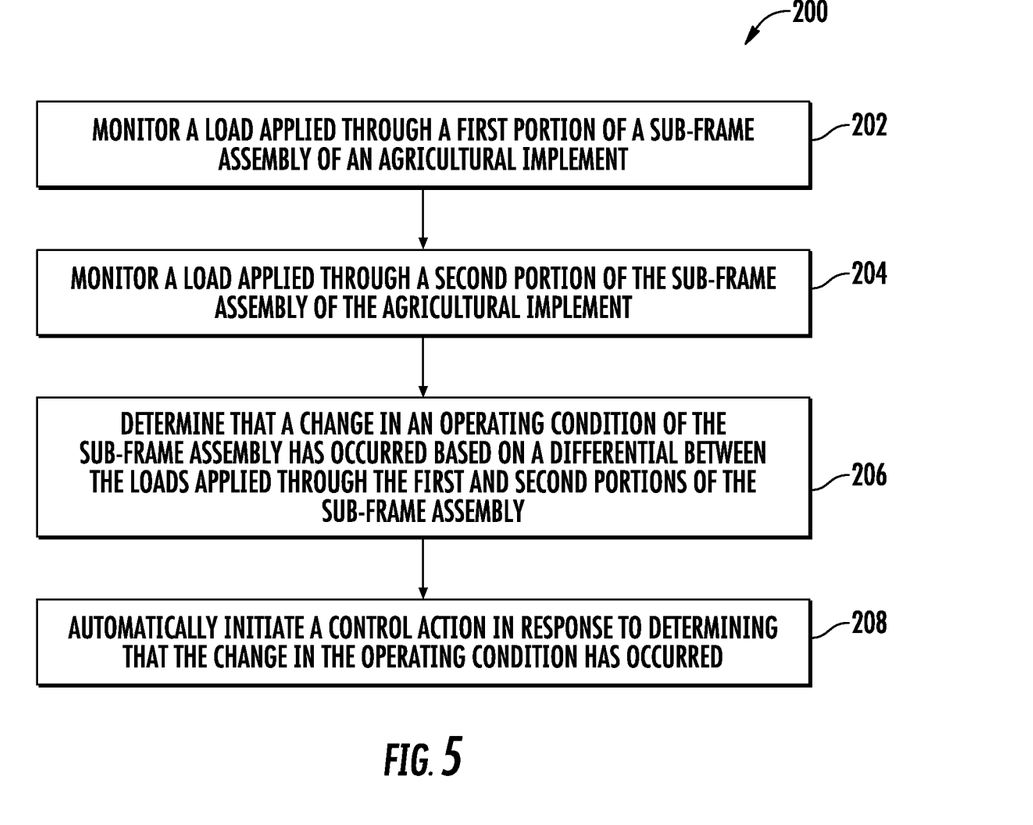
FIG. 5 illustrates a flow diagram of one embodiment of a method for detecting changes in the operating condition of one or more frame assemblies of an agricultural implement in accordance with aspects of the present subject matter.

Referring now to FIG. 5, a flow diagram of one embodiment of a method 200 for detecting changes in the operating condition of one or more frame assemblies of an agricultural implement is illustrated in accordance with aspects of the present subject matter. In general, the method 200 will be described herein with reference to the implement 10 shown in FIGS. 1 and 2, the aft sub-frame assembly 44 described above with reference to FIG. 3, and the various components of the system 100 described above with reference to FIG. 4. However, it should be appreciated that the disclosed method 200 may be executed with implements having any other suitable configuration, frame assemblies having any other frame/assembly configuration, and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 5, at (202) and (204), the method 200 may include monitoring the loads applied through first and second portions of a sub-frame assembly of an agricultural implement. As indicated above, the computing system 110 may be communicatively coupled to one or more load sensors 90 configured to generate data indicative of the loads being transmitted through a sub-frame assembly 102 of the implement 10. For instance, in several embodiments, one or more load sensors 90A, 90B may be provided in operative association with two different, laterally spaced components of the sub-frame assembly 102 (e.g., the left-side and right-side frame support arms 72A, 72B) to allow the computing system 110 to monitor the loads applied through such portions of the sub-frame assembly 102.

Additionally, at (206), the method 200 may include determining that a change in an operating condition of the sub-frame assembly has occurred based on a differential between the loads applied through the first and second portions of the sub-frame assembly. For instance, as indicated above, the computing system 110 may be configured to compare the loads transmitted through the different portions of the sub-frame assembly 102 to identify when a load differential exists across the sub-frame assembly 102. The identified load differential may then, for example, be compared to an associated load differential threshold selected for the sub-frame assembly 102 to determine or infer when a change in the operating condition of the sub-frame assembly 102 has occurred (e.g., due to damage to or failure of one or more components of the sub-frame assembly 102).

Moreover, at (208), the method 200 may include automatically initiating a control action in response to determining that the change in the operating condition has occurred. As indicated above, in one embodiment, the computing system 110 may be configured to automatically generate an operator notification associated with notifying the operator of the operating condition of the sub-frame assembly 102, such as by providing the operator a notification that one or more of the components of the sub-frame assembly 102 are damaged and/or have failed. In addition to such operator notifications and/or as an alternative thereto, the computing system 110 may be configured to automatically control the operation of the implement 10 and/or the associated tow vehicle 12, such as by controlling the operation of one or more drive components 130 of the vehicle 12 to reduce the ground speed of the implement 10 (including reducing the speed to zero to bring the implement 10 to a stop).

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for detecting changes in an operating condition of frame assemblies of an agricultural implement, the system comprising:
a main frame assembly;
a sub-frame assembly coupled to the main frame assembly, the sub-frame assembly comprising a plurality of frame components;
a plurality of ground-engaging tools supported by the plurality of frame components of the sub-frame assembly relative to the main frame assembly;
a first load sensor configured to provide data indicative of a load applied through a first portion of the sub-frame assembly;
a second load sensor configured to provide data indicative of a load applied through a second portion of the sub-frame assembly; and a computing system communicatively coupled to the first and second load sensors, the computing system being configured to:
monitor the loads applied through the first and second portions of the sub-frame assembly based on the data provided by the first and second load sensors; and
determine that a change in an operating condition of the sub-frame assembly has occurred based on a differential between the loads applied through the first and second portions of the sub-frame assembly, the change in operating condition being indicative of a damaged condition of one or more of the plurality of frame components of the sub-frame assembly.

2. The system of claim 1, wherein the computing system is further configured to compare the differential between the loads applied through the first and second portions of the sub-frame assembly to a load differential threshold and determine that the change in the operating status of the agricultural implement has occurred when the differential exceeds the load differential threshold.

3. The system of claim 1, wherein first and second portions comprise first and second frame components of the plurality of frame components of the sub-frame assembly, respectively, the first and second frame components being coupled to the main frame assembly at laterally spaced apart locations.

4. The system of claim 3, wherein the first load sensor comprises one of a load pin, a load cell, or strain gauge provided in operative association with the first frame component and the second load sensor comprises one of a load pin, a load cell, or strain gauge provided in operative association with the second frame component.

5. The system of claim 1, wherein the computing system is further configured to automatically initiate a control action when it is determined that the operating condition of the sub-frame assembly has changed.

6. The system of claim 5, wherein the control action comprises the generation of an operator notification or a reduction in a ground speed of the agricultural implement.

7. An agricultural implement, comprising:
a main frame assembly comprising first and second longitudinally extending frame members, the first and second frame members being spaced laterally apart from each other;
a sub-frame assembly comprising a first frame component coupled to the first frame member and a second frame component coupled to the second frame member;
a plurality of ground-engaging tools supported by the first and second frame components relative to the main frame assembly;
a first load sensor configured to provide data indicative of a load applied through the first frame component of the sub-frame assembly;
a second load sensor configured to provide data indicative of a load applied through a second frame component of the sub-frame assembly; and
a computing system communicatively coupled to the first and second load sensors, the computing system being configured to:
monitor the loads applied through the first and second frame components of the sub-frame assembly based on the data provided by the first and second load sensors; and
determine that a change in an operating condition of the sub-frame assembly has occurred based on a differential between the loads applied through the first and second frame components of the sub-frame assembly, the change in operating condition being indicative of a damaged condition of at least one the first frame component or the second frame component.

8. The agricultural implement of claim 7, wherein the computing system is further configured to compare the differential between the loads applied through the first and second frame components of the sub-frame assembly to a load differential threshold and determine that the change in the operating condition of the sub-frame assembly has occurred when the differential exceeds the load differential threshold.

9. The agricultural implement of claim 7, wherein the first load sensor comprises one of a load pin, a load cell, or strain gauge provided in operative association with the first frame component and the second load sensor comprises one of a load pin, load cell, or strain gauge provided in operative association with the second frame component.

10. The agricultural implement of claim 7, wherein the computing system is further configured to automatically initiate a control action when it is determined that the operating condition of the sub-frame assembly has changed.

11. The agricultural implement of claim 7, wherein the control action comprises the generation of an operator notification or a reduction in a ground speed of the agricultural implement.

12. The agricultural implement of claim 7, wherein the first and second frame components are coupled to the first and second frame members at an aft end of the main frame assembly, the plurality of ground-engaging tools comprising a plurality of finishing tools supported by the sub-frame assembly.

13. A method for detecting changes in an operating condition of frame assemblies of an agricultural implement, the agricultural implement including a main frame assembly and a sub-frame assembly coupled to the main frame assembly, the sub-frame assembly comprising a plurality of frame components, the agricultural implement further comprising a plurality of ground-engaging tools supported by the plurality of frame components of the sub-frame assembly relative to the main frame assembly, the method comprising:
monitoring, with a computing system, a load applied through a first portion of the sub-frame assembly;
monitoring, with the computing system, a load applied through a second portion of the sub-frame assembly;
determining, with the computing system, that a change in an operating condition of the sub-frame assembly has occurred based on a differential between the loads applied through the first and second portions of the sub-frame assembly, the change in operating condition being indicative of a damaged condition of one or more of the frame components of the sub-frame assembly; and
automatically initiating, with the computing system, a control action in response to determining that the change in the operating condition has occurred.

14. The method of claim 13, further comprising comparing the differential between the loads applied through the first and second portions of the sub-frame assembly to a load differential threshold; and
wherein determining that the change in the operating condition has occurred comprising determining that the change in the operating condition of the sub-frame assembly has occurred when the differential exceeds the load differential threshold.

15. The method of claim 13, wherein the first and second portions comprise first and second frame components of the plurality of frame components of the sub-frame assembly, respectively, the first and second frame components being coupled to the main frame assembly at laterally spaced apart locations, and wherein monitoring the loads applied through the first and second portions of the sub-frame assembly comprises monitoring the loads based on data received from first and second load sensors, the first and second load sensors being provided in operative association with the first and second frame components, respectively.

16. The method of claim 13, wherein automatically initiating the control action comprises generating an operator notification associated with notifying an operator of the agricultural implement of the change in the operating condition of the sub-frame assembly.

17. The method of claim 13, wherein automatically initiating the control action comprises automatically reducing a ground speed of the agricultural implement.

* * * * *